Figure 1:
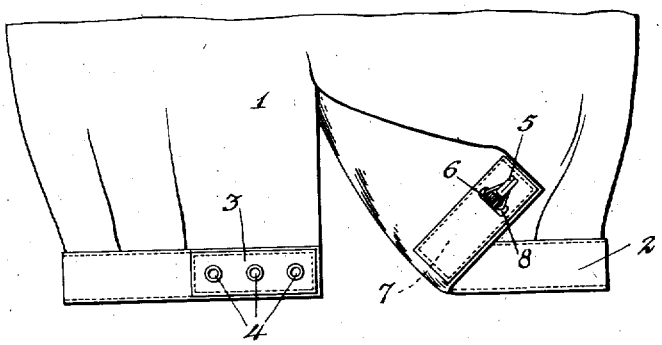

I. SCHEINMAN.

CLOSURE FOR GARMENTS.

APPLICATION FILED FEB. 12, 1916.

Reissued June 27, 1916. 14,159.

WITNESSES

George DuBon

John A. Kehlenbeck

INVENTOR

Isaac Scheinman

BY

Brown & Schenck

ATTORNEYS

UNITED STATES PATENT OFFICE.

ISAAC SCHEINMAN, OF NEW YORK, N. Y., ASSIGNOR TO KATE SCHEINMAN.

CLOSURE FOR GARMENTS.

14,159. Specification of Reissued Letters Patent. Reissued June 27, 1916.

Original No. 1,118,155, dated November 24, 1914, Serial No. 707,959. Application for reissue filed February 12, 1916. Serial No. 78,035.

*To all whom it may concern:*

Be it known that I, ISAAC SCHEINMAN, a citizen of the United States, and resident of New York, borough of Manhattan, in the county of New York and State of New York, have invented certain new and useful Improvements in Closures for Garments, of which the following is a specification.

My invention relates to closures for garments whereby two opposed elements of a garment are detachably connected together and it consists in an engaging device secured to an elastic device, which is itself contained in a variety of pocket.

The invention is particularly adapted to closures for use at the knee portions of knickerbockers but is manifestly applicable to a variety of other garments where a closure of this character is appropriate or advantageous, such, for example, as skirts, corsets, etc.

In the drawings the invention is illustrated in connection with the representation of the lower leg section of a pair of knickerbockers.

Figure 2:
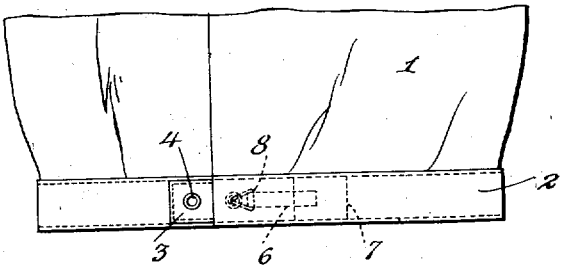
Figure 3:
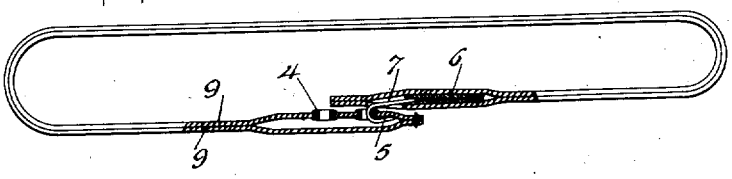
Figure 4:
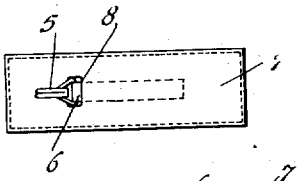
Figure 5:
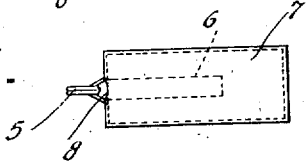

In these drawings Figure 1, represents one leg of a pair of knickerbockers provided with a device embodying my invention, the flap being turned back to exhibit the device more plainly. Fig. 2, represents one leg of a pair of knickerbockers which is secured by the device in question. Fig. 3 shows a band embodying the invention, ready to be attached to a pair of knickerbockers, part of the band being shown in section. Fig. 4 is a plan view of the engaging device and the elastic connection, apart from the garment, but ready to be attached where its service is needed. Fig. 5, represents the engaging device projecting from the end.

Various attempts have been made to secure the bottom openings of knickerbockers, but, in the main, they have lacked the essentials of a satisfactory closure.

Something is needed which can be readily fastened; will hold securely and yet be readily unfastened; something which is economical and yet durable; something which will hold snugly and yet yield to the movement of the body, otherwise it would so confine it as to cause discomfort; nevertheless it must be of pleasing appearance and hold the nap so well closed as to avoid the appearance of negligence. The closure hereinafter described meets these requirements when incorporated in the appropriate garment where it is desired to use the same.

Referring again to the drawings, 1 represents the leg of the knickerbockers, 2 the band at the bottom, to which the fullness is usually gathered.

As will be noticed, the garment has an opening extending for a short distance from the bottom, to permit it to be easily assumed or removed, the length of the band being such as to permit it to pass about the limb of the wearer and lap sufficiently to be fastened.

Near or at one end of the band, I secure one engaging device, in this instance a series of eyelets 4 secured to a short tape 3 composed of strong material which may be, and here is, sewed to the outside of the bottom band, though I do not limit myself to any particular form of engaging device, but may adopt any of the multitude which are well known. At or near the other end of the band 2, I have secured the complemental engaging device, consisting first in this instance of a hook adapted to engage the eyelets. Three eyelets 4 are shown in the drawing but, inasmuch as one only is used at any one time, it is obvious that the number of eyelets or their equivalents may be varied without departing from the invention. Sometimes it may be advisable to use more than three eyelets, while in other cases the provision of a single eyelet will be sufficient where the initial adjustment is correctly incorporated in the garment, as it will be the case where the garment is made to measure to fit an individual customer. It is obvious that the one eyelet actually engaging the corresponding hook—irrespective of the fact whether or not additional eyelets are present—will so coöperate with the other elements of the garment closure that the portion of the garment through which the pocket extends is free from all strain due to the tension exercised upon the remainder of the garment and upon the elements of the closing device. Of course if the device 4 varies from eyelets, the device 5 will vary to accommodate the substitute and vice versa. Second, there is an elastic tongue or yielding connection 6, in this instance a loop of elastic; third, a pocket 7 for holding the yielding connection, here made of a doubled tape of strong material whose edges are secured together, the pocket being provided with an opening 8, for the projection of the hook into the space outside of the pocket. The opening 8, may be made near or at the end of the pocket, as may be desired.

The engaging device proper, hook 5, must project from the pocket in order that it may be ready to engage its complemental device but the yielding connection is to lie, mainly at least, within the pocket and to be secured to it some distance from the opening 8, the purpose of such arrangement being that there shall be space to give appreciable length to the yielding connection, between the hook and the fastening of the connection, otherwise there cannot be sufficient length to the connection to permit an easy yielding and give opportunity for contraction, without which there would be no durability, while if such length were used without the pocket, the engagement of the hook and the eyelets (or the substitutes for them) would not hold the flap down closely enough to present a neat appearance.

Sometimes manufacturers desire to have the full band furnished and in such case the pocket can be formed as shown in Fig. 3, where I exhibit two tapes 9 the edges of which are sewed together so that they are adapted to take the place of the band 2, and they also answer for the pocket proper, marked 7, since they will equally well inclose the yielding connection 6, which may have its inner end sewed to one of them as shown, and may carry at the other end a hook 5 or other engagement just as it did before. So too, an opening 8 can be readily made for the projection of the hook, and the other end of these tapes may be readily provided with eyelets 4 or substitutes, so that the entire device of Fig. 3 is complete and ready for immediate attachment to the garment.

The main point, is, as already noted, the provision for a yielding connection of appreciable length and yet the capability of holding the edge of the flap down closely, which is accomplished by retaining the connection in a pocket and providing an aperture for the projection of the engaging device.

What I claim as my invention and desire to secure by Letters Patent is:—

1. In a closure for garments, a fastening means adapted as described to secure the end of a band of such garment and comprising a strip of strong material containing a plurality of fastening means and adapted to be secured to one end of such band, a second portion of strong material adapted as described to be secured to the other end of the band and formed with a passage adjacent to a point near the edge thereof, an elastic tongue extending through said passage and attached to the strengthening strip at a point remote from the place where the passage opens and a fastening member attached to the projecting end of the tongue and mating with the plurality of fastening members contained in the strip of strong material adapted to be secured to the other end of the band, all substantially as set forth.

2. In knee-breeches, a knee-band, fastening means for the ends thereof, a plurality of one member of the fastening means being disposed on one end of the band, a strip of strong material attached to the other end of the band formed with a passage adjacent to the edge of the band, an elastic tongue extending through the passage and attached to the band and the strengthening material at a point remote from the edge of the band and a fastening member attached to the projecting end of the tongue mating with the fastening members disposed at the other end of the band.

3. In a closure for garments, a fastening means adapted as described to secure the end of a band of such garment and comprising a plurality of fastening means adapted to be secured to one end of the band so as to constitute an engagement member at that end of the garment, an elastic tongue secured to said band at a point some distance from the other end thereof and inclosed for the major part of its length by an enveloping fabric which is provided with a passage adjacent to a point near the edge thereof through which passage said elastic tongue extends and a fastening member attached to the projecting end of said tongue and mating substantially as described with the plurality of the first named engaging members located at the other end of the band, all substantially as set forth.

4. In a garment closing device a single slit formed by two meeting edge portions adapted to be detachably connected together, one of said edge portions having a pocket provided with an opening, an elastic tape in said pocket and normally concealed therein, means whereby said tape is secured in said pocket, said means being located at a distance from said opening, fastening means carried by said tape near its free end, and coöperating fastening means on the other edge portion adapted for detachable engagement with the fastening means carried by the tape whereby said edge portion is yieldingly connected together.

5. In a garment closing device a single slit formed by opposed edge portions adapted for detachable connection together, a fastening means carried by one of said garment portions, an elastic tongue secured to the other garment portion at a point some distance from the edge thereof, and inclosed by an enveloping fabric which is provided with a passage through which said elastic tongue extends, and a fastening member attached to the projecting end of said tongue and mating substantially as described with said fastening means located on said first named garment portion all substantially as set forth.

In testimony whereof I have hereunto set my hand.

ISAAC SCHEINMAN.

Copies of this patent may be obtained for five cents each, by addressing the "Commissioner of Patents. Washington, D. C."